Feb. 18, 1964  H. R. WEISS  3,121,507
MOLDED PLASTIC TRAY
Filed Dec. 14, 1961
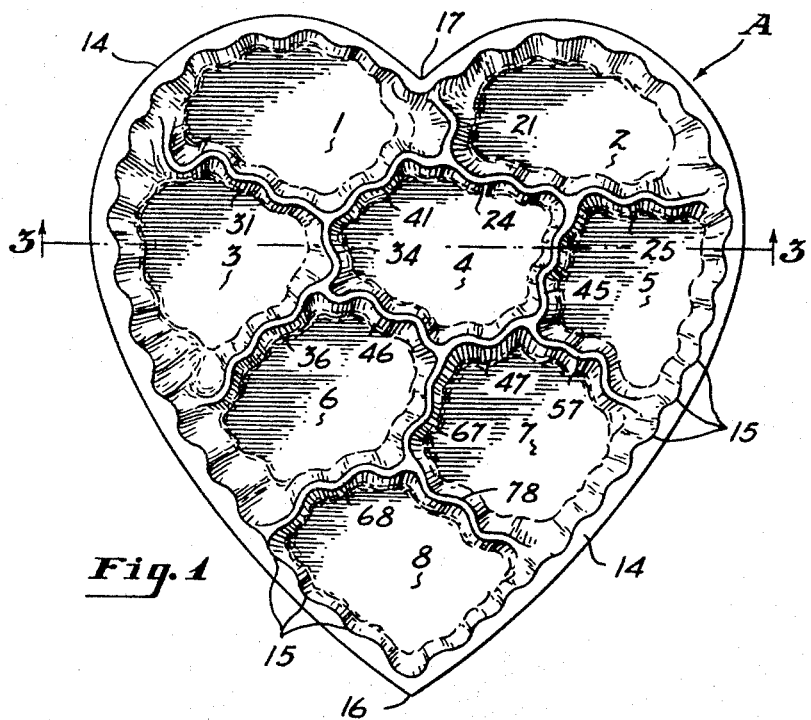
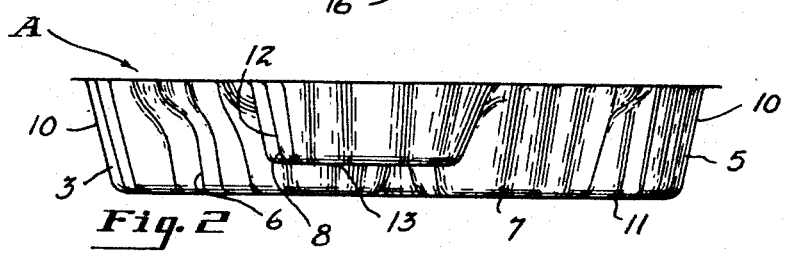
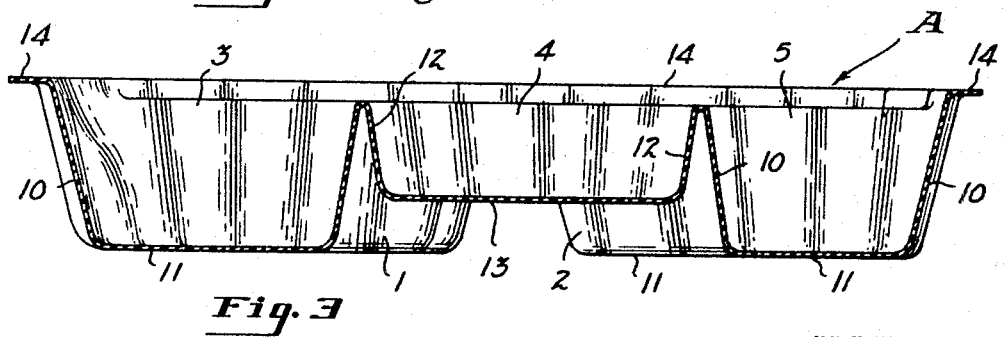
INVENTOR
*Hugh R. Weiss*
BY *McCoy, Greene & Te Grotenhuis*
ATTORNEYS United States Patent Office
3,121,507
Patented Feb. 18, 1964

3,121,507
MOLDED PLASTIC TRAY
Hugh R. Weiss, Montclair, N.J., assignor to The Pantasote Company, Passaic, N.J., a corporation of New Jersey
Filed Dec. 14, 1961, Ser. No. 159,303
4 Claims. (Cl. 220—23.8)

The present invention relates to multiple compartment trays formed from thin sheets of thermoplastic resinous material and more particularly to a one-piece molded plastic tray constructed to receive candy articles of different sizes.

Heretofore, candy boxes have been provided with a multiplicity of paper cups to protect the candy. Small dividers were provided to support layers of candy having less thickness than adjacent pieces of candy so that the upper layer would be at substantially the same elevation as the upper layers of the thicker pieces. It was difficult to pack the candy boxes with different size candies because of the need to insert a large number of paper dividers.

The present invention greatly facilitates the packing of candy articles of different sizes and also provides a more attractive and more efficient holder for the candy. The tray is preferably molded so that the tops of the cups are at substantially the same elevation even where there is a substantial difference in the sizes of the cups. The tray supports the thinner pieces of candy so that the bottoms thereof are at a higher elevation than the bottoms of the larger pieces. It is, therefore, unnecessary to insert horizontal paper dividers to separate an upper layer of candy from a lower layer, and the cost of filling the candy boxes is minimized.

An object of the present invention is to provide a simple, attractive, inexpensive, molded plastic tray for holding candy, cookies, fruit or other articles.

A further object of the present invention is to provide a one-piece packing tray for holding articles of different sizes and for protecting the articles.

Other objects, uses and advantages of the invention will become apparent to those skilled in the art from the following description and claims and from the drawings in which:

FIGURE 1 is a top plan view of a heart-shaped candy tray constructed according to the present invention;

FIGURE 2 is a front elevational view of the tray of FIGURE 1 on the same scale; and FIGURE 3 is a vertical sectional view taken on the line 3—3 of FIGURE 1 and on a larger scale.

Referring more particularly to the drawings, in which like parts are identified by the same numerals throughout the several views, FIGURES 1 to 3 show an 8-count plastic tray constructed according to the present invention and suitable for receiving chocolate-covered candy articles or the like. The tray may be formed by the vacuum molding of flat thermoplastic sheets of uniform thickness as disclosed, for example, in United States Patent No. 2,902,718.

The material used to form the tray may be polyvinyl chloride or similar vinyl resins or various other thermoplastic materials as is well understood in the art. The trays may, for example, be formed from a sheet of polyvinyl chloride having a uniform thickness of 0.001 to 0.02 inch. Such material may be free of plasticizer or may contain small amounts of monomeric or polymeric plasticizers and may contain stabilizers, fillers and pigments. The material of the tray may be a homopolymer of vinyl chloride or a copolymer of a major portion of vinyl chloride and a minor portion of vinyl acetate or other suitable thermoplastic resinous material.

The tray A shown herein has cup-shaped portions 1 to 8 inclusive, it being understood that the tray of this invention may contain a smaller number of cups (i.e., 5 or 6 cups) or a larger number of cups (i.e., 50, 60 or more cups). The tray may, for example, be a candy tray of the type shown in my copending application for patent executed Nov. 28, 1961, and relating to a heart-shaped tray design.

The cups 1, 3, 5, 6 and 7 of the tray A are relatively deep while the cups 2, 4 and 8 are relatively shallow. The deep cups have tapered peripheral walls 10 and flat bottom walls 11. As herein shown, the bottom walls of all of the deep cups are located in the same plane, but will be apparent that this is not essential.

Each of the shallow cups has a tapered peripheral wall 12 and a flat bottom wall 13, which is spaced from the plane containing the bottom walls 11. It will be apparent that the shallow cups need not be of the same depth.

The tray shown herein has a narrow horizontal marginal flange 14 having a heart-shaped perimeter and regular corrugations 15. The apexes 16 and 17 of the heart are located at the medial plane of the tray at opposite ends thereof as shown in FIGURE 1.

The peripheral walls of the cups 1 to 8 define double-wall partitions of wavy shape which have a height many times their average width measured in a direction normal to the partition. In the drawings, the partitions are numbered to identify the two cups which are adjacent that partition. Thus, the partition 21 separates the cup 2 from the cup 1, the partition 25 separates the cup 2 from the cup 5, and the partition 31 separates the cup 3 from the cup 1.

The size and shape of the partitions will be apparent from FIGURES 1 and 3 which are drawn substantially to scale. The wavy partitions 24, 31, 46, 47 and 45 provide the peripheral walls of the cup 4. The wavy partitions 36, 46, 67 and 68 provide peripheral wall portions of the cup 6, and the wavy partitions 57, 47, 67 and 78 provide similar walls for the cup 7.

In the tray A shown herein, the distance between the points 16 and 17 is about 4.8 inches, but it will be understood that larger or smaller trays may be provided having as few as 5 or as many as 100 article-receiving cups or cavities. The deeper cups, such as the cups 1, 3 and 5, may have a depth 20 to 100 percent greater than the depth of the shallow cups, such as the cups 2 and 4, and usually have a depth 25 to 50 percent greater than that of the shallow cups. Where the deeper cups have a depth of 0.6 to 0.7 inch, the shallow cups may have a depth of 0.3 to 0.4 inch, for example.

The size and shape of the various cups may vary considerably, but it is preferable to locate the upper surfaces of the partitions at substantially the same elevation. If the top surfaces of the partitions are flat they may be located substantially in a common horizontal plane as in the tray A shown herein or within a small fraction of an inch of such plane (i.e., spaced from said common plane a distance less than one-tenth the maximum depth of the tray).

The marginal flange 14 may likewise be located in said common plane, but is often preferable to extend the peripheral walls at the margin of the tray so that said flange is located in a horizontal plane parallel to and a substantial distance (i.e., at least 0.1 inch) above said common plane as shown in the drawings. With such a construction the marginal flange protects the candy, fruit, or other articles in the tray, particularly those in the outermost cups.

The various cups or cavities of the tray may have various sizes and shapes. They may be oblong rather than square or generally circular rather than rectangular. The deep cups may, for example, have a maximum width 1 to 3 times their depth and a maximum length 1 to 3 times their maximum width. The shallow cups may, for example, have a maximum width 1 to 5 times their depth and a maximum length 1 to 3 times their maximum width. The size and shape of each cavity will depend to a considerable extent on the size of the candy, particularly in the case of chocolate-covered nuts or cherries. It is preferable to provide the cups with corrugated or pleated peripheral walls to accommodate irregular shaped pieces having globs of chocolate or other protuberances.

The expansible partitions of the tray are preferably narrow as shown, for example, in the drawings. The maximum height of each partition is preferably 5 to 25 times its average width measured in a direction normal to its outer surface, and the length of each partition is usually greater than said depth (i.e., 10 to 30 times said average width), although some partitions may have a length much less than that of the other partitions.

It will be understood that the above description is by way of illustration rather than limitation and that, in accordance with the provisions of the patent laws, variations and modifications of the specific devices disclosed herein may be made without departing from the spirit of the invention.

Having described my invention, I claim:

1. A one-piece heart-shaped candy tray formed from a thin sheet of polyvinyl chloride resin and having a multiplicity of closely spaced cup-shaped portions of different depth separated by narrow expansible partitions of wavy shape, each of said partitions having two wall portions which form part of the corrugated peripheral walls of two adjacent cups, the top surfaces of said partitions being located substantially in a common plane, the bottom walls of the deeper cups being spaced from said plane a distance about 25 to 50 percent greater than the distance from said plane to the bottom walls of the shallow cups.

2. A one-piece molded plastic tray as defined in claim 1 wherein the marginal portions of the tray extend a substantial distance above said common plane to provide a marginal flange of heart-shaped outline.

3. A molded one-piece multiple-compartment candy tray formed from a thin sheet of thermoplastic resinous material having a substantially uniform thickness of 0.001 to 0.02 inch, said tray having at least 5 closely spaced cup-shaped candy-receiving portions, each cup-shaped portion having a corrugated axially tapered peripheral wall and a relatively flat bottom wall, the peripheral wall portions of adjacent cups forming narrow corrugated double-wall partitions, at least three of the cups having a depth at least 20 percent less than that of the remaining cups, the upper portions of said partitions being at substantially the same elevation.

4. A molded one-piece heart-shaped tray for chocolate-covered candy of different sizes, said tray being formed from a thin sheet of unplasticized polyvinyl chloride resin which has a uniform thickness of 0.001 to 0.02 inch and is free of plasticizer, said tray having at least five closely spaced pleated cup-shaped portions of different depth and of a size to receive said candy separated by narrow expansible partitions of wavy shape, each of said partitions having two wall portions which form part of the pleated peripheral walls of two adjacent cups, the top surfaces of said partitions being located substantially at the same elevation, at least three cups having a depth about 25 to 50 percent greater than that of the remaining cups, the deep cups having a maximum width 1 to 3 times their depth and a maximum length 1 to 3 times their maximum width, the shallow cups having a maximum width 1 to 5 times their depth and a maximum length 1 to 3 times their maximum width.

References Cited in the file of this patent

UNITED STATES PATENTS

| | | |
|---|---|---|
| 1,943,698 | Schurmann | Jan. 16, 1934 |
| 2,352,684 | Braddock | July 4, 1944 |
| 3,016,178 | Knocks | Jan. 9, 1962 |